H. C. BRIGGS.
Cultivator.
No. 84,165.
Patented Nov. 17, 1868.
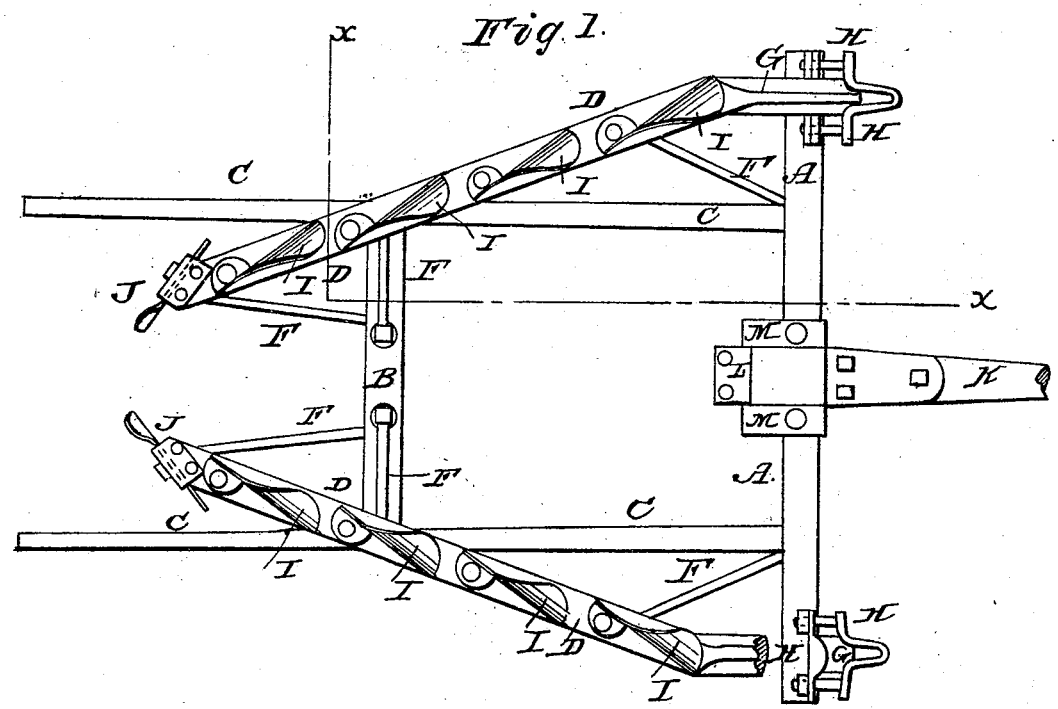
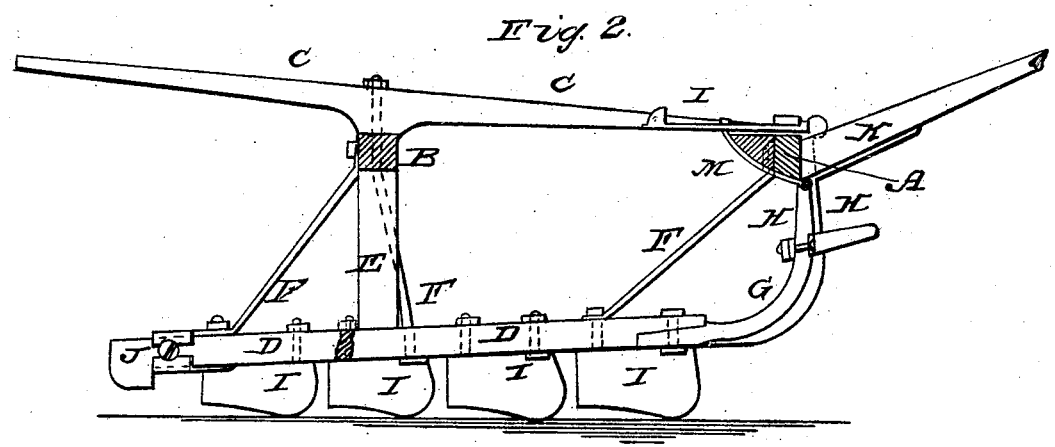

HORACE C. BRIGGS, OF WEST AUBURN, MAINE.

Letters Patent No. 84,165, dated November 17, 1868.

IMPROVED HOEING-MACHINE.

The Schedule referred to in these Letters Patent and making part of the same.

*To all whom it may concern:*

Be it known that I, HORACE C. BRIGGS, of West Auburn, in the county of Androscoggin, and State of Maine, have invented a new and useful Improvement in Hoeing-Machine; and I do hereby declare that the following is a full, clear, and exact description thereof, which will enable others skilled in the art to make and use the same, reference being had to the accompanying drawings, forming part of this specification.

Figure 1 is a bottom view of my improved machine.

Figure 2 is a detail sectional view of the same, taken through the line x-x, fig. 1.

Similar letters of reference indicate corresponding parts.

My invention has for its object to furnish an improved machine, by means of which the ground between the rows of plants may be thoroughly stirred up, and turned over, and the soil thrown around the roots of the plants, and which shall, at the same time, be simple in construction and easily operated; and it consists in the construction and combination of the various parts, as hereinafter more fully described.

A is the front or longer cross-bar of the frame of the machine, and B is the shorter or rear cross-bar.

The cross-bars A and B are connected to each other, and held in their proper relative positions, by the two longitudinal bars, C, the rear ends of which extend back, and serve as handles to the machine.

D are the runners, which are set in inclined positions, their forward ends being farther apart than their rear ends, and the rear parts of which are connected with the rear cross-bar B by the uprights or knees, E. The runners D are strengthened and further connected with the cross-bars A and B by the brace-rods F, as shown in the drawings.

The forward ends of the runners D are connected to the ends of the front cross-bar A by the curved pieces G, formed upon or securely attached to the forward ends of the horizontal parts of said runners, as shown.

The parts or pieces G are made in the form shown in the drawings, that is to say, their inner or concave sides are grooved longitudinally, and the corners of their outer or convex sides are bevelled off and concaved, as shown in fig. 1.

H are the draught-irons, the forward part or piece of which is made in the form shown in figs. 1 and 2, having an eye or loop for the attachment of the whiffle-trees, and the ends of which fit upon the concaved edges of the said parts G, and the rear parts of which are formed with a convex projection upon their forward sides, fitting into the groove upon the rear or concave sides of the said pieces G.

The parts or pieces of the irons H are clamped to the pieces G by bolts, as shown in figs. 1 and 2, so that the said draught-irons may be adjusted in a higher or lower position, according to the depth at which it is desired to have the hoes or plows run.

I are the hoes or plows, which are made in about the form shown in the drawings, so as to cut up the weeds, stir the ground, and turn it over, at the same time each plow or hoe moving the soil a little towards the plants.

The hoes I are formed with ears upon their upper edges, by means of which they are secured to the lower side of the runners D.

J are adjustable inwardly-projecting hoes, the shanks of which enter and are secured by set-screws in grooves, formed in caps attached to the rear ends of the runners D, as shown in figs. 1 and 2, so that the said hoes may be adjusted to throw the soil more or less closely around the plants, as may be desired.

K is the tongue, which is hinged to the lower side of the middle part of the front cross-bar A, and the play of which is regulated by an adjustable slide, L, passing through a keeper, attached to the upper side of the cross-bar A, and the rear part of which is supported by a block, M, securely attached to the rear side of the bar A, so that the tongue may be allowed to have a greater or less vertical play, according to the distance said slide-bar is adjusted to project over the said tongue.

I claim as new, and desire to secure by Letters Patent—

1. The combination of the cross-bars A and B, longitudinal bars C, runners D, curved parts or pieces G, and plows or hoes I with each other, substantially as herein shown and described, and for the purpose set forth.

2. The combination of the inwardly-projecting adjustable hoes J with the rear ends of the runners D, substantially as herein shown and described, and for the purpose set forth.

3. The draught-irons H, constructed as desired, in combination with the curved parts G of the runners D, substantially as herein shown and described, and for the purpose set forth.

4. The combination of the adjustable bar or slide L with the hinged tongue K, and front cross-bar A, substantially as herein shown and described, and for the purpose set forth.

HORACE C. BRIGGS.

Witnesses:
ENOS T. LUCE,
WM. F. MORRILL.